United States Patent
Xu

(10) Patent No.: US 8,879,459 B2
(45) Date of Patent: Nov. 4, 2014

(54) METHOD AND SYSTEM FOR SENDING COUNTING RESPONSE BY USER EQUIPMENT IN MULTIMEDIA BROADCAST MULTICAST SERVICE

(75) Inventor: Hui Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 9 days.

(21) Appl. No.: 13/700,666

(22) PCT Filed: Mar. 24, 2011

(86) PCT No.: PCT/CN2011/072132
§ 371 (c)(1),
(2), (4) Date: Nov. 28, 2012

(87) PCT Pub. No.: WO2012/000332
PCT Pub. Date: Jan. 5, 2012

(65) Prior Publication Data
US 2013/0070660 A1    Mar. 21, 2013

(30) Foreign Application Priority Data
Jun. 29, 2010    (CN) .......................... 2010 1 0212986

(51) Int. Cl.
H04H 20/71    (2008.01)
H04W 72/00    (2009.01)
H04W 4/06     (2009.01)
H04W 24/08    (2009.01)
H04W 24/10    (2009.01)

(52) U.S. Cl.
CPC .............. *H04W 72/005* (2013.01); *H04W 4/06* (2013.01); *H04W 24/08* (2013.01); *H04W 24/10* (2013.01)
USPC ........................................................ 370/312

(58) Field of Classification Search
USPC .......................................... 370/312; 455/436
See application file for complete search history.

(56) References Cited

U.S. PATENT DOCUMENTS

2008/0274759 A1    11/2008    Chen
2008/0316952 A1*   12/2008    Gruber et al. ................. 370/312
(Continued)

FOREIGN PATENT DOCUMENTS

CN    101374252 A    2/2009
(Continued)

OTHER PUBLICATIONS

International Search Report in international application No. PCT/CN2011/072132, mailed on Jun. 23, 2011.
(Continued)

*Primary Examiner* — Wei Zhao
(74) *Attorney, Agent, or Firm* — Oppedahl Patent Law Firm, LLC

(57) ABSTRACT

The present disclosure discloses a method and system for sending a counting response by a User Equipment (UE) in a Multimedia Broadcast Multicast Service (MBMS), wherein the method includes: within a specific period or upon occurrence of a triggering event, the UE actively initiates a feedback process; otherwise, a network side sends a feedback request indication to the UE, the UE sends a counting response to the network side according to the indication, and the network side counts UEs according to counting responses from UEs. According to the solution provided by the present disclosure, the UE may send the counting response according to the feedback triggering condition under the condition of multiple MCCHs, and the network side may count the UEs correctly for enabling or disabling the MBSFN transmission.

17 Claims, 5 Drawing Sheets

(56) References Cited

U.S. PATENT DOCUMENTS

2009/0264130 A1* 10/2009 Catovic et al. .............. 455/436
2010/0058133 A1*  3/2010 Lee ............................. 714/748

FOREIGN PATENT DOCUMENTS

| | | |
|---|---|---|
| CN | 101742407 A | 6/2010 |
| CN | 101883327 A | 11/2010 |
| WO | 2008029181 A1 | 3/2008 |

OTHER PUBLICATIONS

English Translation of the Written Opinion of the International Search Authority in international application No. PCT/CN2011/072132, mailed on Jun. 23, 2011.

3GPP TSG-RAN WG2 Meeting #70bis, Orange, Use cases and discussions related to UE status report, Stockholm, Jun. 28, 2010, 4 total pages.

Supplementary European Search Report in European application No. 11800077.7, mailed on Feb. 17, 2014.

* cited by examiner

METHOD AND SYSTEM FOR SENDING COUNTING RESPONSE BY USER EQUIPMENT IN MULTIMEDIA BROADCAST MULTICAST SERVICE

TECHNICAL FIELD

The present disclosure relates to a service information reporting technology for a User Equipment (UE) in a Multimedia Broadcast Multicast Service (MBMS) system, in particular to a method and system for sending a counting response by a UE in an MBMS.

BACKGROUND

In order to effectively utilize mobile network resources, the 3rd Generation Partnership Project (3GPP) provides the MBMS, which is the technology for transmitting data from a data source to multiple target mobile terminals. MBMS achieves resource sharing of networks (including core network and access network) and improves utilization rate of network resources, in particular air interface resources.

In a Long Term Evolution (LTE) system, a UE (or a terminal) is notified of possible changes of an MBMS, including session start, service carrier update or session stop etc., wherein Downlink Control Information (DCI) and an MBMS-Radio Network Temporary Identifier (M-RNTI) may be sent on a Physical Downlink Control Channel (PDCCH) at first. The UE further reads a Multicast Control Channel (MCCH) message according to related information in the DCI, which is called an MCCH notification mechanism. The MCCH will send specific service configuration parameters, such as service ID, Radio Link Control (RLC) of a service, Media Access Control (MAC), configuration parameters of a physical layer, and etc.

In the LTE system, MBMS has two carrying modes: broadcasting mode and enhanced broadcasting mode. Without multicast mode, a network side cannot know which MBMS the UE receives or intends to receive. The enhanced broadcast is between a broadcast and a multicast, and absorbs advantages of simple flow of the broadcast and optimized resources of the multicast. With the enhanced broadcasting carrying of the MBMS, a UE can log in to/log out of a Broadcast Multicast-Service Center (BM-SC) only by joining process/leaving process on an application layer without any signaling interaction or information storage on a carrying network layer. The enhanced broadcast is optimized and expanded from the broadcast, for example in an access network, the enhanced broadcast will not send data to a cell without a receiving user. For the enhanced MBMS, it is necessary to consider the state and number of the UE receiving the MBMS during configuring System Frame Number (SFN) and allocating resources, so the UE which receives or intends to receive the MBMS needs to feed information back, which is called the uplink feedback of the MBMS. In order to enable/disable Multimedia Broadcast Single Frequency Network (MBSFN) transmission in 3GPP Rel10 MBMS, the network side needs to acquire receiving state information of the UE, such as the number of UEs which are receiving given MBMS, therefore, a mechanism is needed to trigger a UE to report its receiving state information.

In order that the network side can acquire the number of users requiring MBMS in each cell, the MBMS system introduces a counting process.

The counting process refers to that: at start of an MBMS session or during the session (also called recounting), the network side counts the number of users receiving or intending to receive an MBMS in a cell to determine whether to adopt the MBSFN transmission. Intending to receive the MBMS refers to: the UE prepares to receive an MBMS from the MBSFN, and the UE monitors a notification message of the MCCH. When preparing to initiate a counting/recounting process, the network side adds the identifier and access probability of the MBMS into access information of the MCCH. The reason for using the access probability is that not all users are needed to be connected for feedback and as long as the feedback number reaches a threshold; otherwise, many idle users may cause uplink congestion.

SUMMARY

In the research and practice of the conventional art, the inventor of the present disclosure finds that the conventional art has the following problem: the method by which the 3GPP Rel10 MBMS needs to enable or disable in the manner of MBSFN transmission is based on counting responses of the UEs, however, there is no method for sending a counting response by a UE in the conventional art, i.e., the UE does not know when receiving state information is to be sent and what information related to the counting response is to be sent.

In order to count receiving states of the UEs, it is necessary to design a solution for implementing uplink feedback for the UEs.

Based on the above, the main purpose of the present disclosure is to provide a method and system for sending a counting response by a UE in an MBMS. The UE reports the counting response to the network side according to the solution for the network side enabling or disabling an MBMS service in the manner of MBSFN transmission.

In order to solve the technical problem, the technical solution of the present disclosure is implemented as follows:

a method for sending a counting response by a UE in an MBMS includes: a triggering condition for the feedback of the UE is set, the UE sends a counting response to the network side according to the triggering condition, and the network side counts UEs according to counting responses from UEs, and enables or disables an MBSFN transmission according to the counting result.

The triggering condition may include at least one of the following: a periodic feedback, an event-triggered feedback, and a feedback request indication sent by the network side.

The feedback period of the periodic feedback may be less than a service session duration.

The event triggering the feedback may include: session start, session end, carrier change, cell update and cell handover.

The feedback request indication is carried in a Radio Resource Control (RRC) signaling or a MAC signaling.

The counting response may be carried in one of the following: RRC connection request information, RRC connection reconfiguration completion information, RRC connection reestablishment request information, RRC connection reestablishment completion information, RRC connection establishment completion information, cell update information, random access request information, a measurement report, an MAC CE message, and a private signaling.

A system for sending a counting response by a UE in an MBMS includes:

a UE, which is configured to send a counting response to a network side according to a set triggering condition for feeding back the counting response from the UE; and a network side, which is configured to count UEs according to counting responses from UEs, and enable or disable an MBSFN transmission according to the counting result.

The UE may include: a triggering unit, which is configured to trigger the UE to send the counting response according to a feedback period, a triggering event, or a feedback request indication; and a feedback unit, which is configured to send the counting response.

The network side may include: a counting unit, which is configured to count UEs according to the counting responses from the UEs; and an operating unit, which is configured to enable or disable the MBSFN transmission according to the counting result.

The network side may further include: a carrying unit, which is configured to carry the feedback period, the triggering event or the feedback request indication in a RRC message or an MAC message; and a sending unit, which is configured to send the RRC message or the MAC message.

The UE may further include: a receiving unit, which is configured to receive the RRC message or the MAC message.

The counting unit may include at least one Evolved NodeB (eNB) and one Multi-cell/Multicast Coordination Entity (MCE), and the operating unit includes an MCE, wherein the eNB is configured to count UEs according to the counting responses, and report the counting result to the MCE; and the MCE is configured to summarize counting results reported by eNBs, and enable or disable the MBSFN transmission according to the summarized counting result.

The counting response may include at least one of the following: a UE state, an MBSFN area Identifier (ID), a notification indicator, an MBMS ID, a UE ID, a Physical Multi-Channel (PMCH) ID, a session ID, a Logic Channel Identifier (LCID), a service list index, a feedback period and a triggering event.

The state of a UE may include: interested in receiving, receiving, stopping receiving, receiving carrier change, cell update, and cell handover.

Enabling of the MBSFN transmission may include transmitting the MBMS in a manner of an MBSFN in an MBSFN area; and disabling of the MBSFN transmission may include stopping transmitting the MBMS in the manner of the MBSFN in the MBSFN area.

In the present disclosure, the network side indicates the UE to report the counting response or the UE sends the counting response initiatively. In the present disclosure, under the condition of multiple MCCHs, the UE may send the counting response according to the triggering condition of the feedback, and the network side may correctly count the UEs. The requirement for enabling or disabling the MBSFN transmission is satisfied.

DETAILED DESCRIPTION

To make the object, technical solution and advantages of the present disclosure clearer, the present disclosure is further described below with reference to embodiments and drawings in detail.

The present disclosure is described below with reference to drawings and embodiments in detail.

The application scenario of the present disclosure is: the cell where the UE is located belongs to one or more MBSFN areas, wherein each MBSFN area corresponds to an MCCH, and the network side needs to determine whether to enable or disable the MBSFN transmission according to the receiving state information of the UE.

In the present disclosure, for the process of triggering the feedback counting response of the UE in the MBMS, the network side sends the period of the uplink feedback, triggering event, or feedback request indication, and the UE sends the counting response to the network side according to the triggering condition. The network side counts UEs according to the counting responses, and then enables or disables the MBSFN transmission according to the counting result.

Figure 1:
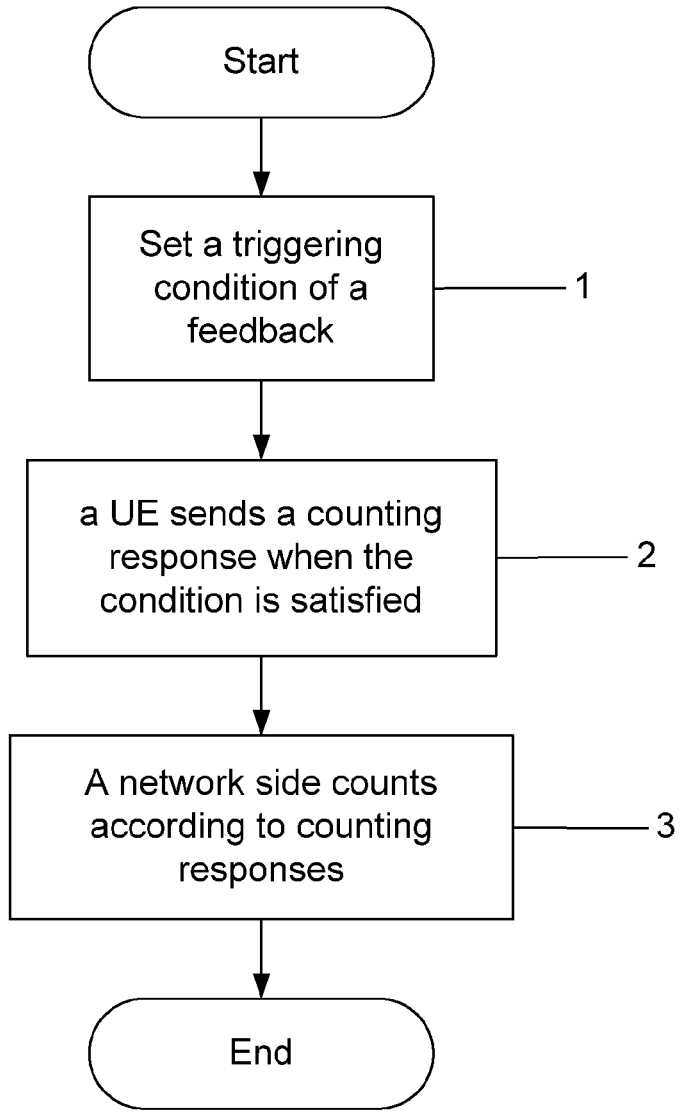
FIG. 1 is a flowchart of a method for implementing an uplink feedback in the present disclosure.

Generally, as shown in FIG. 1, the method for sending the counting response by the UE in the MBMS includes:

Step 1: The triggering condition for the feedback counting response of the UE is set.

Step 2: The UE sends the counting response to the network side according to the triggering condition.

Step 3: The network side counts UEs according to the counting responses from the UEs.

The network side includes an eNB and a Multi-cell/Multicast Coordination Entity (MCE), wherein the MCE is a logic entity and can exist independently or exist as a part of other entities, for example as a part of the eNB. The UE is a terminal with the capability of receiving the MBMS. The network side may also be a relay or a Home eNodeB (HeNB).

In Step 1, the triggering condition includes at least one of: periodic triggering, event triggering, and network side triggering. The period can be selected by the UE or indicated through RRC message or MAC message by the network side. Preferably, the period selected by the UE can be one or more MCCH modifying periods or Multicast Channel (MCH) scheduling periods. Preferably, the period is generally less than the service session duration. The event can be: session start, session end, carrier change, cell update, or cell handover. The network side triggering can be: the network side indicates the UE to send the counting response through RRC message or MAC message. Preferably, the RRC message can be an MCCH message or a system message, and the MAC message can be an MAC CE message.

In Step 2, the UE can be in an RRC idle state (RRC_IDLE) or an RRC connected state (RRC_CONNECTED).

The counting response sent by the UE includes but is not limited to one or more of the following: UE state, MBSFN area ID, notification indicator, MBMS ID, UE ID, Physical Multicast Channel (PMCH) ID, session ID, Logical Channel ID (LCID), service list index, feedback period, and triggering event.

The UE state includes: intending to receive, receiving, stopping receiving, cell update, and cell handover.

In Step 2, if in the RRC_IDLE (short for idle) state, the UE initiates a random access process at first, then sends an RRC connection establishment request, and additionally sends the counting response in the RRC connection establishment request information at the same time, for example, the reason for the RRC connection establishment is set as MBMS reception.

If in the RRC_CONNECTED (short for connected) state, the UE additionally sends the counting response in the RRC connection reconfiguration completion information, for example, the reason for the RRC connection reconfiguration is set as MBMS reception.

In Step 3, the step of the network side counting UEs according to the counting responses from the UEs is that the network side acquires the number of UEs which are receiving the MBMS and/or intend to receive the MBMS according to the counting responses of the UEs. If a probability factor is adopted in the feedback process, the network side may acquire the number of the UEs in the MBSFN area according to the counting response of the UE and the probability factor.

The UEs include UEs which are receiving the MBMS and/or intend to receive the MBMS.

The counting response sent by the UE generally has a small data volume, so it can be carried and sent in an existing RRC signaling, an MAC CE signaling or a private signaling, wherein the existing RRC signaling includes one or more of the following: RRC connection request information, RRC connection reconfiguration completion information, RRC connection reestablishment request information, RRC connection reestablishment completion information, RRC connection establishment completion information, cell update information, random access request, and measurement report.

The feedback request indication information sent by the network side in an MCCH or a system message can be an independent RRC message or an information element (IE).

The essence of the technical solution of the present disclosure is further described below with embodiments.

First Embodiment

The application scenario of the embodiment is that: the UE periodically initiates a feedback process, wherein the period is selected by the UE itself.

Figure 2:
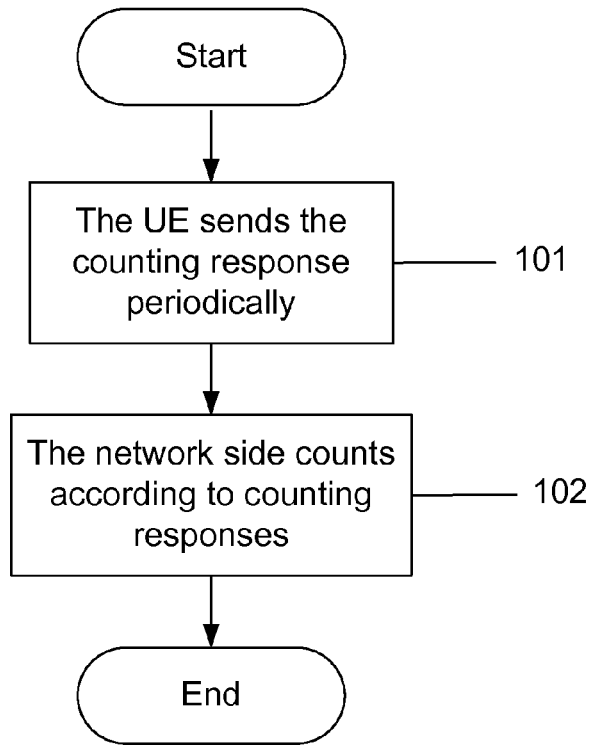
FIG. 2 is a flowchart of periodically sending a counting response in the present disclosure.

FIG. 2 is a flowchart of a method for periodically initiating a feedback by a UE in the first embodiment of the present disclosure. As shown in FIG. 2, the method includes the following steps:

S101: The UE selects a feedback period, wherein the UE sends the counting response to the network side in each feedback period.

The feedback period may be a period defined in the specification. Preferably, The feedback period may be one or more MCCH modifying periods, or one or more MCH Scheduling Periods (MSPS). Different UEs can select the same or different feedback periods. In order to reduce the number of the UEs synchronously initiating the feedback, in the feedback period, the UE can randomly select the time of sending the counting response. Preferably, in each feedback period, each UE sends one counting response, and if the network side receives multiple counting responses of the same UE in one feedback period, only one count is made.

The feedback period is generally less than the service session duration.

The UE may be in the RRC connected state or in the RRC idle state.

The network side generally includes an eNB and an MCE.

The UE in the RRC connected state generally sends the counting response by the RRC signaling or MAC CE signaling; and if being scheduled in a feedback period, the UE sends the counting response, otherwise, it requests for uplink resources for sending the counting response by a Schedule Request (SR) or a Buffer Status Report (BSR).

Preferably, the RRC signaling includes one or more of the following: RRC connection request information, RRC connection reconfiguration completion information, RRC connection reestablishment request information, RRC connection reestablishment completion information, RRC connection establishment completion information, cell update information, random access request information, measurement report, private RRC signaling, and MAC CE message.

Figure 3:
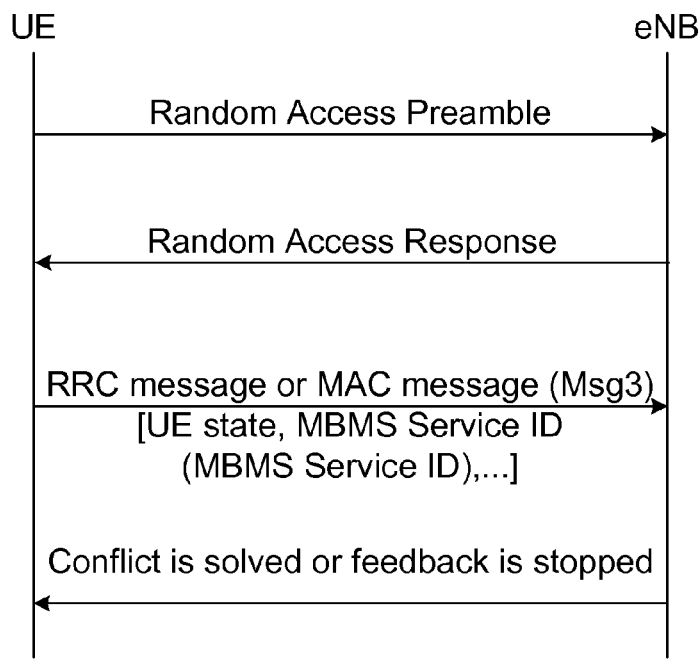
FIG. 3 is a diagram of triggering an uplink feedback by an event in the present disclosure.

The UE in the RRC idle state generally sends the counting response by random access process, for example, the counting response of the UE is carried in the RRC connection request information in the message 3 (Msg3). FIG. 3 is a diagram showing the feedback of the UE in the RRC idle state. In order to reduce conflicts in the random access process, one part of a random access preamble sequence can be reserved for the MBMS UE, or the MBMS UE is allocated with random access resources which are different from that of the unicast UE.

The counting response includes one or more of the following: UE state, MBSFN area ID, notification indicator, MBMS ID, UE ID, PMCH ID, session ID, LCID, service list index, feedback period, and triggering event. The UE state includes: intending to receive, receiving, stopping receiving, cell update, and cell handover.

S102: The network side counts UEs according to the counting responses from the UEs.

The network side counts the counting responses of the UEs within a period of time.

If failing to receive the counting response of a UE within the period of time, the network side will think that the UE has stopped receiving or does not intend to receive the MBMS; and if receiving multiple counting responses of a same UE within the period of time, the network side only makes one count.

The network side counting the counting responses and then adjusts the MBSFN transmission according to the counting result.

Adjusting the MBSFN transmission is to enable or disable the MBSFN transmission by the network side, wherein enabling the MBSFN transmission is to transmit the MBMS with the MBSFN in the MBSFN area, and disabling the MBSFN transmission is to stop transmitting the MBMS with the MBSFN in the MBSFN area. Generally, disabling the MBSFN transmission needs to be notified to the UE in advance and cannot affect the existing service session process.

When the network side includes at least one eNB and one MCE, the eNB counts UEs according to the counting responses from the UEs., and reports the counting result to the MCE. The MCE summarizes the counting result reported by the eNB, and then enables or disables the MBSFN transmission according to the summarized counting result.

After the feedback of the UE in the idle state is ended, the UE in the connected state can be switched back to the idle state by the RRC signaling, other high-layer signaling, or private signaling.

The first embodiment shows the periodic feedback process initiated by the UE, and as long as the service session duration is not less than the feedback period, the receiving states of the UEs can be counted correctly in the process, and therefore the implementation is simple.

Second Embodiment

Figure 4:
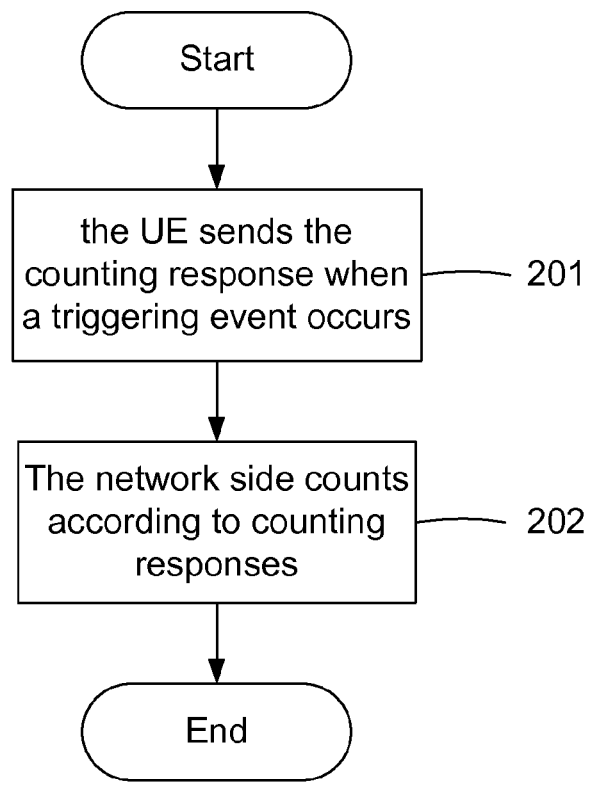
FIG. 4 is a flowchart of triggering a feedback by a network side in the third/fourth embodiment of the present disclosure.

The scenario of the embodiment is that: the UE sends an uplink counting response when a specific event occurs. As shown in FIG. 4, in the embodiment, the method for sending the counting response by the UE includes the following steps:

S201: The UE selects the event triggering the feedback counting response, and when the triggering event occurs, the UE sends the counting response to the network side.

The triggering event includes at least one of the following: session start, session end, carrier change, cell update, and cell handover.

The UE may be in the RRC connected state or in the RRC idle state.

The network side generally includes an eNB and an MCE.

The UE in the RRC connected state generally sends the counting response by the RRC signaling or MAC CE signaling; and when the triggering event occurs, the UE will send the counting response if it has available uplink resources, otherwise, it requests for uplink resources for sending the counting response by the SR or BSR.

Preferably, the RRC signaling includes one or more of the following: RRC connection request information, RRC connection reconfiguration completion information, RRC connection reestablishment request information, RRC connection reestablishment completion information, RRC connection establishment completion information, cell update information, random access request information, measurement report, private RRC signaling, and MAC CE message.

The UE in the RRC idle state generally sends the counting response by random access process, for example, the counting response of the UE is carried in the RRC connection request information in the message 3. In order to reduce conflicts in the random access process, one part of a random access permeable sequence can be reserved for the MBMS UE, or the MBMS UE is allocated with random access resources which are different from that of the unicast UE.

The counting response includes one or more of the following: UE state, MBSFN area ID, notification indicator, MBMS ID, UE ID, PMCH ID, session ID, LCID, service list index, feedback period, and triggering event. The UE state includes: intending to receive, receiving, stopping receiving, cell update, and cell handover.

S202: The network side counts UEs according to the counting responses from the UEs.

The network side counts the counting responses of the UEs within a period of time, wherein the period of time is generally set by the network side as required.

If receiving multiple counting responses of a same UE within the period of time, the network side only makes one count.

The network side counts the counting responses and then adjusts the MBSFN transmission according to the counting result.

Adjusting the MBSFN transmission is to enable or disable the MBSFN transmission by the network side, wherein enabling the MBSFN transmission is to transmit the MBMS with MBSFN in the MBSFN area, and disabling the MBSFN transmission is to stop transmitting the MBMS with MBSFN in the MBSFN area. Generally, disabling the MBSFN transmission needs to be notified to the UE in advance and cannot affect the existing service session process.

After the feedback of the UE in the idle state is ended, the UE in the connected state can be switched back to the idle state by the RRC signaling, other high-layer signaling, or private signaling.

The second embodiment shows the process of triggering the feedback by an event initiated by the UE, wherein the receiving states of the UEs can be counted correctly in real time, and therefore the implementation is simple.

Third Embodiment

The scenario of the embodiment is that: the network side sends a feedback request indication, and the UE sends the counting response according to the indication.

Figure 5:
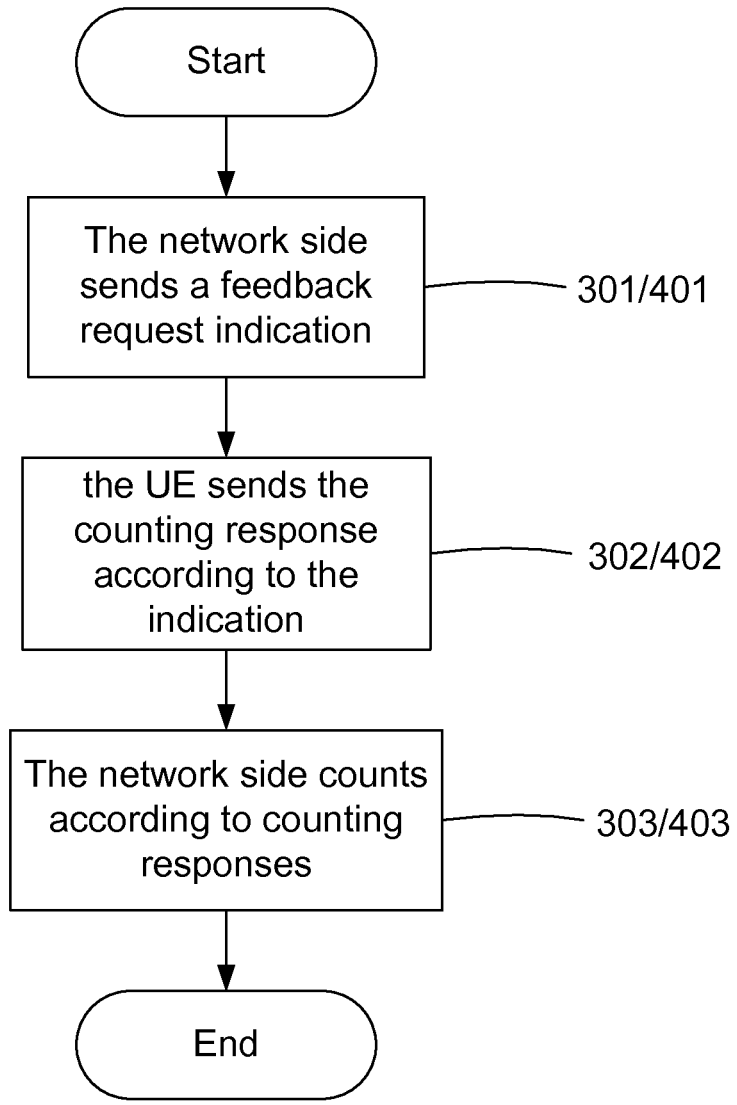
FIG. 5 is a flowchart of an uplink feedback of a UE in an RRC IDLE state in the present disclosure.

As shown in FIG. 5, in the embodiment, the method for requesting for the feedback counting response of the UE by the network side includes:

S301: The network side sends the feedback request indication to the UE by the RRC message or the MAC CE message.

Preferably, the RRC message may be the MCCH message or the system message, and may be an independent RRC message or an IE.

The feedback request indication generally includes an MBMS ID, an MBMS session ID, or bitmap information indicating the MBMS session; and in order to reduce the number of UEs synchronously sending the feedback, the feedback request indication further includes a probability factor generally.

The UE may be in the RRC connected state or in the RRC idle state; and for the above two different states, generally, the probability factor is respectively set to different values.

The network side generally includes an eNB and an MCE.

S302: The UE sends the counting response to the network side according to the feedback request indication.

The UE acquires the feedback request indication by reading the RRC message or MAC CE message. For the MBMS having been started, the UE can directly acquire the feedback request indication; and for the un-started MBMS, the UE generally needs corresponding mechanisms to monitor the feedback request indication, such as monitoring the MCCH notification information or paging information.

The UE in the RRC connected state generally sends the counting response by the RRC signaling or MAC CE signaling; and when the feedback request indication is received, the UE will send the counting response if it has available uplink resources, otherwise, it requests for uplink resources for sending the counting response by the SR or BSR.

Preferably, the RRC signaling includes one or more of the following: RRC connection request information, RRC connection reconfiguration completion information, RRC connection reestablishment request information, RRC connection reestablishment completion information, RRC connection establishment completion information, cell update information, random access request information, measurement report, private RRC signaling and MAC CE message.

The UE in the RRC idle state generally sends the counting response by random access process, for example, the counting response of the UE is carried in the RRC connection request information in the message 3 In order to reduce conflicts in the random access process, one part of a random access permeable sequence can be reserved for the MBMS UE, or the MBMS UE is allocated with random access resources which are different from that of the unicast UE.

The counting response includes one or more of the following: UE state, MBSFN area ID, notification indicator, MBMS ID, UE ID, PMCH ID, session ID, LCID, service list index, feedback period, and triggering event. The UE state includes: intending to receive, receiving, stopping receiving, cell update, and cell handover.

S303: The network side counts UEs according to the counting responses from the UEs.

The network side counts the counting responses of the UEs within a period of time, wherein the period of time is generally set by the network side as required.

If receiving multiple counting responses of a same UE within the period of time, the network side only makes one count.

The network side counts UEs according to the counting responses from the UEs and then adjusts the MBSFN transmission according to the counting result.

Adjusting the MBSFN transmission is to enable or disable the MBSFN transmission by the network side, wherein enabling the MBSFN transmission is to transmit the MBMS with MBSFN in the MBSFN area, and disabling the MBSFN transmission is to stop transmitting the MBMS with MBSFN in the MBSFN area. Generally, disabling the MBSFN transmission needs to be notified to the UE in advance and cannot affect the existing service session process.

After the feedback of the UE in the idle state is ended, the UE in the connected state can be switched back to the idle state by the RRC signaling, other high-layer signaling, or private signaling.

The third embodiment shows the feedback process initiated by the network side, wherein the receiving state of the UE can be counted as required but the implementation is complex.

Fourth Embodiment

The scenario of the embodiment is that: the network side sends the feedback request indication, and the UE sends the counting response according to the indication. As shown in FIG. 5, in the embodiment, the method for requesting for the feedback counting response of the UE by the network side includes the following steps:

S401: The network side sends the feedback request indication to the UE by the RRC message or the MAC CE message.

Preferably, the RRC message may be the MCCH message or the system message, and may be an independent RRC message or an IE.

The feedback request indication generally includes an MBMS ID, an MBMS session ID, the bitmap information indicating the MBMS session, feedback period, or feedback triggering event. In order to reduce the number of UEs synchronously sending feedback, the feedback request indication further includes a probability factor generally.

The UE may be in the RRC connected state or in the RRC idle state; and for the above two different states, generally, the probability factor is respectively set to different values.

The network side generally includes an eNB and an MCE.

S402: The UE sends the counting response to the network side according to the feedback request indication.

The UE acquires the feedback request indication by reading the RRC message or MAC CE message. For the MBMS having been started, the UE can directly acquire the feedback request indication; and for the un-started MBMS, the UE generally needs corresponding mechanisms to monitor the feedback request indication, such as monitoring the MCCH notification information or paging information.

The UE in the RRC connected state generally sends the counting response by the RRC signaling or MAC CE signaling; and when the feedback request indication is received, the UE will send the counting response if it has available uplink resources, otherwise, it requests for uplink resources for sending the counting response by the SR or BSR.

Preferably, the RRC signaling includes one or more of the following: RRC connection request information, RRC connection reconfiguration completion information, RRC connection reestablishment request information, RRC connection reestablishment completion information, RRC connection establishment completion information, cell update information, random access request information, measurement report, private RRC signaling and MAC CE message.

The UE in the RRC idle state generally sends the counting response by random access process, for example, the counting response of the UE is carried in the RRC connection request information in the message 3. In order to reduce conflicts in the random access process, one part of a random access permeable sequence can be reserved for the MBMS UE, or the MBMS UE is allocated with random access resources which are different from that of the unicast UE.

After sending the counting response for the first time, the UE generally sends a periodic feedback or an event-triggered feedback to the network side according to the feedback period or the feedback triggering event.

The counting response includes one or more of the following: UE state, MBSFN area ID, notification indicator, MBMS ID, UE ID, PMCH ID, session ID, LCID, service list index, feedback period, and triggering event. The UE state includes: intending to receive, receiving, stopping receiving, cell update, and cell handover.

S403: The network side counts UEs according to the counting responses from the UEs.

The network side counts the counting responses of the UEs within a period of time, wherein the period of time is generally set by the network side as required. If a feedback period is set, the period of time is generally not less than the feedback period, wherein the feedback period is generally less than the service session duration.

If receiving multiple counting responses of a same UE within the period of time, the network side only makes one count.

The network side counts the counting responses and then adjusts the MBSFN transmission according to the counting result.

Adjusting the MBSFN transmission is to enable or disable the MBSFN transmission by the network side, wherein enabling the MBSFN transmission is to transmit the MBMS with MBSFN in the MBSFN area, and disabling the MBSFN transmission is to stop transmitting the MBMS with MBSFN in the MBSFN area. Generally, disabling the MBSFN transmission needs to be notified to the UE in advance and cannot affect the existing service session process.

After the feedback of the UE in the idle state is ended, the UE in the connected state can be switched back to the idle state by the RRC signaling, other high-layer signaling, or private signaling.

The fourth embodiment shows the feedback process initiated by the network side, and the difference between the third embodiment and fourth embodiment lies in that: the UE, after sending the counting response for the first time, needs to continue the feedback according to the feedback period or feedback triggering event, and the network side can control the feedback process but the implementation is complex.

The system for sending a counting response by the UE in the MBMS includes a UE and a network side. The UE is used for sending the counting response to the network side according to the set triggering condition of the feedback counting response of the UE. The network side is used for counting UEs according to the counting responses from the UEs, and enabling or disabling the MBSFN transmission according to the counting result.

Figure 6:
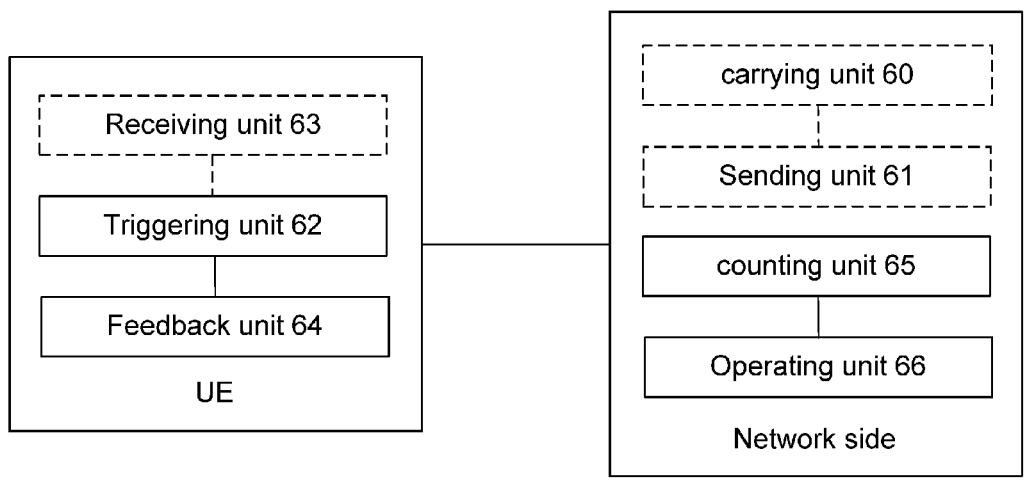
FIG. 6 is a diagram showing a structure of a system for sending a counting response by a UE in an MBMS in the present disclosure.

The UE may include a triggering unit 62 and a feedback unit 64. As shown in FIG. 6, the triggering unit 62 is used for triggering the UE to send the counting response according to feedback period, triggering event or feedback request indication. The feedback unit 64 is used for sending the counting response.

The network side may include a counting unit 65 and an operating unit 66. The counting unit 65 is used for counting UEs according to the counting responses from the UEs. The operating unit 66 is used for enabling or disabling the MBSFN transmission according to the counting result. The counting unit 65 includes at least one eNB and MCE; and the operating unit 66 includes an MCE. The eNB is used for counting UEs according to the counting responses from the UEs and reporting the counting result to the MCE; and the MCE is used for summarizing the counting result reported by the eNB and then enabling or disabling the MBSFN transmission according to the summarized counting result.

The network side may further include a carrying unit 60 and a sending unit 61. As shown in FIG. 6, wherein the carrying unit 60 is used for carrying the feedback period, triggering event or feedback request indication in the RRC message or MAC message, wherein the RRC message may be an MCCH message or a system message and the MAC message may be an MAC CE message; the sending unit 61 is used for sending the RRC message or MAC message.

The UE may further include a receiving unit 63, which is used for receiving the RRC message or MAC message.

As shown in FIG. 6, the UE or network side in the system may further include a configuring unit, which is used for configuring the triggering condition to perform the uplink feedback.

The described above are only preferred embodiments of the present disclosure, and the protection scope of the present disclosure is not limited herein.

The invention claimed is:

1. A method for sending a counting response by a User Equipment (UE) in a Multimedia Broadcast Multicast Service (MBMS), comprising:
   setting a triggering condition for a feedback of the UE;
   sending, by the UE, a counting response to a network according to the triggering condition; and
   counting UEs, by the network according to counting responses from UEs, and enabling or disabling, by the network, a Multimedia Broadcast Single Frequency Network (MBSFN) transmission according to the counting result,
   wherein the triggering condition comprises:
   a feedback request indication sent by the network,
   wherein the enabling the MBSFN transmission comprises transmitting the MBMS in a manner of an MBSFN in an MBSFN area,
   wherein the disabling the MBSFN transmission comprises stopping transmitting the MBMS in the manner of the MBSFN in the MBSFN area.

2. The method according to claim 1, wherein the feedback request indication is carried in a Radio Resource Control (RRC) signalling or a Media Access Control (MAC) signalling.

3. A method for sending a counting response by a User Equipment (UE) in a Multimedia Broadcast Multicast Service (MBMS), comprising:
   setting a triggering condition for a feedback of the UE;
   sending, by the UE, a counting response to a network according to the triggering condition; and
   counting UEs, by the network according to counting responses from UEs, and enabling or disabling, by the network, a Multimedia Broadcast Single Frequency Network (MBSFN) transmission according to the counting result,
   wherein the enabling the MBSFN transmission comprises transmitting the MBMS in a manner of an MBSFN in an MBSFN area,
   wherein the disabling the MBSFN transmission comprises stopping transmitting the MBMS in the manner of the MBSFN in the MBSFN area,
   wherein the counting response comprises at least one of the following:
   a UE state, an MBSFN area Identifier (ID), a notification indicator, an MBMS ID, a UE ID, a Physical Multicast Channel (PMCH) ID, a session ID, a Logic Channel Identifier (LCID), and a service list index.

4. The method according to claim 3, wherein the UE state comprises: interested in receiving, receiving, stopping receiving, receiving carrier change, cell update, and cell handover.

5. The method according to claim 3, wherein the counting response is carried in one of the following:
   RRC connection request information, RRC connection reconfiguration completion information, RRC connection reestablishment request information, RRC connection reestablishment completion information, RRC connection establishment completion information, cell update information, random access request information, a measurement report, a MAC Control Element (CE) message, and a private signalling.

6. A system for sending a counting response by a User Equipment (UE) in a Multimedia Broadcast Multicast Service (MBMS), comprising:
   a UE configured to send a counting response to a network according to a set triggering condition for feeding back the counting response from the UE; and
   the network configured to count UEs according to counting responses from UEs, and enable or disable a Multimedia Broadcast Single Frequency Network (MBSFN) transmission according to the counting result,
   wherein enabling of the MBSFN transmission comprises transmitting the MBMS in a manner of an MBSFN in an MBSFN area,
   wherein disabling of the MBSFN transmission comprises stopping transmitting the MBMS in the manner of the MBSFN in the MBSFN area,
   wherein the network comprises:
   a counting unit configured to count UEs according to the counting responses from the UEs; and
   an operating unit configured to enable or disable the MBSFN transmission according to the counting result,
   wherein
   the network further comprises:
   a carrying unit configured to carry a feedback request indication in a Radio Resource Control (RRC) message or a Media Access Control (MAC) message; and
   a sending unit configured to send the RRC message or the MAC message; and
   the UE further comprises:
   a receiving unit configured to receive the RRC message or the MAC message.

7. A system for sending a counting response by a User Equipment (UE) in a Multimedia Broadcast Multicast Service (MBMS), comprising:
   a UE configured to send a counting response to a network according to a set triggering condition for feeding back the counting response from the UE; and
   the network configured to count UEs according to counting responses from UEs, and enable or disable a Multimedia Broadcast Single Frequency Network (MBSFN) transmission according to the counting result, wherein enabling of the MBSFN transmission comprises transmitting the MBMS in a manner of an MBSFN in an MBSFN area,
wherein disabling of the MBSFN transmission comprises stopping transmitting the MBMS in the manner of the MBSFN in the MBSFN area,
wherein the network comprises:
a counting unit configured to count UEs according to the counting responses from the UEs; and
an operating unit configured to enable or disable the MBSFN transmission according to the counting result,
wherein the counting unit comprises at least one Evolved NodeB (eNB) and one Multi-cell/Multicast Coordination Entity (MCE), and the operating unit comprises an MCE; wherein
the eNB is configured to count UEs according to the counting responses from the UEs, and report the counting result to the MCE; and
the MCE is configured to summarize counting results reported by eNBs, and enable or disable the MBSFN transmission according to the summarized counting result.

8. A system for sending a counting response by a User Equipment (UE) in a Multimedia Broadcast Multicast Service (MBMS), comprising:
a UE configured to send a counting response to a network according to a set triggering condition for feeding back the counting response from the UE; and
the network configured to count UEs according to counting responses from UEs, and enable or disable a Multimedia Broadcast Single Frequency Network (MBSFN) transmission according to the counting result,
wherein enabling of the MBSFN transmission comprises transmitting the MBMS in a manner of an MBSFN in an MBSFN area,
wherein disabling of the MBSFN transmission comprises stopping transmitting the MBMS in the manner of the MBSFN in the MBSFN area,
wherein the counting response comprises at least one of the following:
a UE state, an MBSFN area ID, a notification indicator, an MBMS ID, a UE ID, a PMCH ID, a session ID, an LCID, and a service list index.

9. The method according to claim 1, wherein the counting response comprises at least one of the following:
a UE state, an MBSFN area Identifier (ID), a notification indicator, an MBMS ID, a UE ID, a Physical Multicast Channel (PMCH) ID, a session ID, a Logic Channel Identifier (LCID), and a service list index.

10. The method according to claim 2, wherein the counting response comprises at least one of the following:
a UE state, an MBSFN area Identifier (ID), a notification indicator, an MBMS ID, a UE ID, a Physical Multicast Channel (PMCH) ID, a session ID, a Logic Channel Identifier (LCID), and a service list index.

11. The method according to claim 9, wherein the UE state comprises:
interested in receiving, receiving, stopping receiving, receiving carrier change, cell update, and cell handover.

12. The method according to claim 10, wherein the UE state comprises:
interested in receiving, receiving, stopping receiving, receiving carrier change, cell update, and cell handover.

13. The method according to claim 9, wherein the counting response is carried in one of the following:
RRC connection request information, RRC connection reconfiguration completion information, RRC connection reestablishment request information, RRC connection reestablishment completion information, RRC connection establishment completion information, cell update information, random access request information, a measurement report, a MAC CE message, and a private signalling.

14. The method according to claim 10, wherein the counting response is carried in one of the following:
RRC connection request information, RRC connection reconfiguration completion information, RRC connection reestablishment request information, RRC connection reestablishment completion information, RRC connection establishment completion information, cell update information, random access request information, a measurement report, a MAC CE message, and a private signalling.

15. The system according to claim 6, wherein the UE comprises:
a triggering unit configured to trigger the UE to send the counting response according to the feedback request indication; and
a feedback unit configured to send the counting response.

16. The system according to claim 7, wherein the UE comprises:
a triggering unit configured to trigger the UE to send the counting response according to a feedback request indication; and
a feedback unit configured to send the counting response.

17. The system according to claim 8, wherein the UE comprises:
a triggering unit configured to trigger the UE to send the counting response according to a feedback request indication; and
a feedback unit configured to send the counting response.

* * * * *